US011015031B2

(12) United States Patent
Markgraf

(10) Patent No.: US 11,015,031 B2
(45) Date of Patent: May 25, 2021

(54) REINFORCED POLYOXYMETHYLENE COMPOSITION WITH LOW EMISSIONS

(71) Applicant: Celanese Sales Germany GmbH, Taunus (DE)

(72) Inventor: Kirsten Markgraf, Weinheim (DE)

(73) Assignee: Celanese Sales Germany GmbH, Taunus (DE)

( * ) Notice: Subject to any disclaimer, the term of this patent is extended or adjusted under 35 U.S.C. 154(b) by 5 days.

(21) Appl. No.: 16/007,567

(22) Filed: Jun. 13, 2018

(65) Prior Publication Data

US 2018/0362720 A1 Dec. 20, 2018

Related U.S. Application Data

(60) Provisional application No. 62/583,178, filed on Nov. 8, 2017, provisional application No. 62/520,911, filed on Jun. 16, 2017.

(51) Int. Cl.

| C08J 5/04 | (2006.01) |
|---|---|
| C08L 59/04 | (2006.01) |
| C08K 5/3492 | (2006.01) |
| C08K 9/04 | (2006.01) |
| C08K 7/02 | (2006.01) |
| C08K 5/29 | (2006.01) |
| C08K 3/40 | (2006.01) |
| C08K 7/14 | (2006.01) |

(52) U.S. Cl.
CPC .............. *C08J 5/043* (2013.01); *C08K 3/40* (2013.01); *C08K 5/29* (2013.01); *C08K 5/34922* (2013.01); *C08K 7/02* (2013.01); *C08K 7/14* (2013.01); *C08K 9/04* (2013.01); *C08L 59/04* (2013.01); *C08J 2371/02* (2013.01)

(58) Field of Classification Search
CPC ......... C08J 5/043; C08J 2371/02; C08K 3/40; C08K 5/29; C08K 5/34922; C08K 7/02; C08K 7/14; C08K 9/04; C08L 59/04
See application file for complete search history.

(56) References Cited

U.S. PATENT DOCUMENTS

| 3,455,867 A | 7/1969 | Berardinelli et al. |
|---|---|---|
| 3,574,786 A | 4/1971 | Shinichi Ishida et al. |
| 3,901,846 A | 8/1975 | Freed |
| 3,985,661 A | 10/1976 | Ikeda et al. |
| 4,070,415 A | 1/1978 | Sextro et al. |
| 4,469,842 A | 9/1984 | Kritchevsky |
| 4,480,071 A | 10/1984 | Natarajan et al. |
| 4,493,751 A | 1/1985 | Cherdron et al. |
| 4,652,594 A | 3/1987 | Auerbach et al. |
| 4,670,508 A | 6/1987 | Ohdaira et al. |
| 4,780,508 A | 10/1988 | Cunningham et al. |
| 4,828,755 A | 5/1989 | Kusumgar et al. |
| 4,929,712 A | 5/1990 | Sugiyama et al. |
| 5,156,913 A | 10/1992 | Collins et al. |
| 5,326,846 A | 7/1994 | Nagai et al. |
| 5,344,875 A | 9/1994 | Niino |
| 5,393,813 A | 2/1995 | Schauhoff et al. |
| 5,446,086 A | 8/1995 | Sugiyama et al. |
| 5,478,895 A | 12/1995 | Sugiyama et al. |
| 5,530,061 A | 6/1996 | Sanacia et al. |
| 5,866,256 A | 2/1999 | Izumitani et al. |
| 5,942,568 A | 8/1999 | Niino et al. |
| 6,077,908 A | 6/2000 | Yahiro |
| 6,211,268 B1 | 4/2001 | Matsumura et al. |
| 6,238,733 B1 | 5/2001 | Therolf |
| 6,271,302 B1 | 8/2001 | Matsushima |
| 6,936,651 B2 | 8/2005 | Flexman et al. |
| 7,169,887 B2 | 1/2007 | Papke |
| 7,943,726 B2 | 5/2011 | Haubs et al. |
| 8,138,247 B2 | 3/2012 | Shinohara et al. |
| 8,829,085 B2 | 9/2014 | Markgraf et al. |
| 9,303,145 B2 * | 4/2016 | Markgraf ............... C08G 18/56 |
| 9,540,553 B2 * | 1/2017 | Markgraf ................ C08K 7/14 |
| 2004/0030094 A1 * | 2/2004 | Zierer .................... C08L 59/00 528/425 |
| 2005/0043492 A1 | 2/2005 | Chin et al. |
| 2005/0107513 A1 | 5/2005 | Papke |
| 2005/0222303 A1 | 10/2005 | Cernohous |

(Continued)

FOREIGN PATENT DOCUMENTS

| CN | 101130621 | 2/2008 |
|---|---|---|
| CN | 101343396 | 1/2009 |

(Continued)

OTHER PUBLICATIONS

K. Kawaguchi, E. Masuda, Y. Tajima, Journal of Applied Polymer Science, vol. 107, pp. 667-673 (2008).

(Continued)

*Primary Examiner* — Sanza L. McClendon
(74) *Attorney, Agent, or Firm* — Dority & Manning, P.A.

(57) ABSTRACT

The present disclosure is generally directed to a fiber reinforced polyoxymethylene polymer composition having extremely low formaldehyde emission characteristics. The polymer composition generally contains reinforcing fibers in an amount from 3% to 70% by weight. The reinforcing fibers are combined with a polyoxymethylene polymer having a relatively high melt volume flow rate. The polymer composition can also contain a coupling agent for better integrating the reinforcing fibers into the polymer matrix. In addition to low emission properties, the polymer composition of the present disclosure displays excellent mechanical properties.

17 Claims, No Drawings

(56) References Cited

U.S. PATENT DOCUMENTS

| | | | |
|---|---|---|---|
| 2006/0058457 A1 | 3/2006 | Kawaguchi | |
| 2006/0111473 A1 | 5/2006 | Yuan et al. | |
| 2007/0066746 A1 | 3/2007 | Gunnewig et al. | |
| 2010/0022691 A1 | 1/2010 | Katsuchi et al. | |
| 2010/0056676 A1 | 3/2010 | Hase | |
| 2011/0184098 A1 | 7/2011 | Sunaga et al. | |
| 2013/0102718 A1 | 4/2013 | Markgraf et al. | |
| 2013/0331488 A1 | 12/2013 | Markgraf | |
| 2014/0179865 A1 | 6/2014 | Markgraf et al. | |
| 2016/0177219 A1* | 6/2016 | Markgraf | C08L 59/02 508/107 |
| 2016/0257805 A1 | 9/2016 | Markgraf et al. | |
| 2019/0010299 A1 | 1/2019 | Markgraf et al. | |

FOREIGN PATENT DOCUMENTS

| | | |
|---|---|---|
| CN | 101759955 | 6/2010 |
| CN | 102532798 | 7/2012 |
| CN | 103131124 | 6/2013 |
| DE | 2162345 | 7/1972 |
| EP | 1630198 A1 | 1/2006 |
| GB | 1331829 | 9/1973 |
| JP | 55-145529 | 11/1980 |
| JP | 56-105905 | 8/1981 |
| JP | 3284675 | 12/1991 |
| JP | 6179671 | 6/1994 |
| JP | 7010871 | 1/1995 |
| JP | 7033766 | 2/1995 |
| JP | 07242724 | 9/1995 |
| JP | 11 181232 | 7/1999 |
| JP | 11181231 | 7/1999 |
| JP | 2000154181 | 6/2000 |
| JP | 2000-336241 | 12/2000 |
| JP | 4741120 | 6/2002 |
| JP | 2009-286874 | 12/2009 |
| JP | 2010037445 | 2/2010 |
| JP | 2011246566 | 12/2011 |
| WO | WO 1999/46331 | 9/1999 |
| WO | WO 2006/105918 A1 | 12/2006 |
| WO | WO 2010/035351 A1 | 1/2010 |
| WO | WO 2010/073529 | 7/2010 |

OTHER PUBLICATIONS

International Search Report and Written Opinion PCT/IB2018/054314, dated Aug. 24, 2018, 13 pages.

Zhou JianSong et al, "Advance on tribological performance of ultra high molecular weight polyethylene" Journals of Materials and Engineering, vol. 23, No. 1, pp. 142-145.

Deng Wenjuan et al, "Study on tribological properties of PON/HDPE blend", Engineering Plastics Application, vol. 38, No. 6, pp. 54-56.

Mehrabzadeh et al. Impact Modification of Polyacetal by Thermoplastic Elastomer Polyurethane. Journal of Applied Polymer Science, vol. 84, 2573-2582 (2002).

GUR ultra-high molecular weight polyethylene. Ticona. Mar. 2001.

JPH0822122 English abstract only.

* cited by examiner

REINFORCED POLYOXYMETHYLENE COMPOSITION WITH LOW EMISSIONS

RELATED APPLICATIONS

The present application is based upon and claims priority to U.S. Provisional Application Ser. No. 62/583,178, filed on Nov. 8, 2017, and to U.S. Provisional Application Ser. No. 62/520,911, filed on Jun. 16, 2017, which are both incorporated herein by reference in their entirety.

BACKGROUND

Polyacetal polymers, which are commonly referred to as polyoxymethylene polymers, have become established as exceptionally useful engineering materials in a variety of applications. For instance, because polyoxymethylene polymers have excellent mechanical properties, fatigue resistance, abrasion resistance, chemical resistance, and moldability, they are widely used in constructing polymer articles, such as articles for use in the automotive industry and the electrical industry.

The mechanical properties of polyoxymethylene molding compositions are the reason for their use in numerous applications. To improve their properties, polyoxymethylene polymers are often provided with additives to adapt the properties for a specific application, for example by using reinforcing fibers or tribological modifiers. For instance, polyoxymethylene polymers have been combined with reinforcing fibers for producing polymer compositions with increased tensile strength.

Unfortunately, however, adding one additive to improve a property or characteristic of the polyoxymethylene polymer can degrade or compromise other properties or characteristics of the polymer. For example, adding relatively great amounts of reinforcing fibers to polyoxymethylene polymer compositions can result in polymer compositions having less than desirable flow properties. In addition, the use of substantial amounts of reinforcing fibers can increase formaldehyde emissions from the polymer.

In view of the above, a need exists for an improved reinforced polyoxymethylene polymer composition that has enhanced physical properties in combination with acceptable formaldehyde emission levels.

SUMMARY

In general, the present disclosure is directed to a polymer composition containing a polyoxymethylene polymer combined with reinforcing fibers. In one embodiment, for instance, the polymer composition can contain substantial amounts of reinforcing fibers, such as glass fibers. In accordance with the present disclosure, the reinforcing fibers are combined with a particular type of polyoxymethylene polymer. The combination of the polyoxymethylene polymer and the reinforcing fibers has been found to dramatically and unexpectedly reduce formaldehyde emission levels while providing a polymer composition with enhanced physical properties.

In one embodiment, for instance, the polymer composition can comprise a polyoxymethylene polymer combined with reinforcing fibers, such as glass fibers. The reinforcing fibers can be present in the polymer composition in an amount generally from about 3% by weight to about 60% by weight. For instance, the reinforcing fibers can be present in an amount greater than about 3% by weight, such as in an amount greater than about 5% by weight, such as in an amount greater than about 7% by weight, such as in an amount greater than about 9% by weight. In other embodiments, the reinforcing fibers can be present in the polymer composition in substantial amounts such as greater than about 30% by weight, such as greater than about 35% by weight, such as greater than about 38% by weight and generally in an amount less than about 60% by weight, such as in an amount less than about 55% by weight. In other embodiments, however, the reinforcing fibers can be present in amounts from about 5% by weight to about 20% by weight, such as in an amount from about 8% by weight to about 15% by weight.

In accordance with the present disclosure, a polyoxymethylene polymer is selected that has a relatively high melt volume flow rate and optionally may contain substantial amounts of functional groups. For example, the polyoxymethylene polymer can have a melt volume flow rate of greater than about 20 $cm^3/10$ min when measured at 190° C. and at a load of 2.16 kg according to ISO Test 1133. For instance, the melt volume flow rate of the polyoxymethylene polymer can be greater than about 25 $cm^3/10$ min, such as greater than about 30 $cm^3/10$ min, such as greater than about 35 $cm^3/10$ min and generally less than about 100 $cm^3/10$ min.

In one embodiment, in addition to having a relatively high melt volume flow rate, the polyoxymethylene polymer can also contain functional groups that can facilitate mixing and bonding to the reinforcing fibers. The functional groups may comprise, for instance, hydroxyl groups. For example, in one embodiment, the polyoxymethylene polymer contains terminal hydroxyl groups in an amount greater than about 10 mmol/kg, such as greater than about 15 mmol/kg. For example, the polyoxymethylene polymer can contain terminal hydroxyl groups in an amount greater than about 30 mmol/kg, such as greater than about 35 mmol/kg, such as greater than about 40 mmol/kg, such as greater than about 45 mmol/kg, such as greater than about 50 mmol/kg.

The polymer composition can also contain a coupling agent. The coupling agent can be designed to react with the functional groups on the polyoxymethylene polymer and couple the polyoxymethylene polymer to the reinforcing fibers. For example, in one embodiment, the reinforcing fibers can contain a sizing agent that couples to the coupling agent. The coupling agent, for instance, may comprise a polyisocyanate. For example, the coupling agent can comprise an aliphatic diisocyanate, a cycloaliphatic diisocyanate, an aromatic diisocyanate, or mixtures thereof. The coupling agent can be present in the composition in an amount from about 0.1% by weight to about 2% by weight.

As described above, the polyoxymethylene polymer containing the relatively high melt volume flow rate produces a polymer composition having reduced formaldehyde emissions. For instance, the composition can emit less than about 4.5 mg/kg, such as less than about 4 mg/kg, such as less than about 3.5 mg/kg, such as even less than about 3 mg/kg of formaldehyde when tested according to Test VDA 275 after 24 hours using a plaque having a width of 2 mm. In order to further reduce formaldehyde emissions, the polymer composition can contain a formaldehyde scavenger. For example, the formaldehyde scavenger may comprise a melamine. The formaldehyde scavenger can be present in the composition in an amount from about 0.01% by weight to about 2% by weight, such as in an amount from about 0.05% by weight to about 0.8% by weight.

The polymer composition of the present disclosure can have excellent mechanical properties including strength properties. For instance, when the polymer composition contains relatively large amounts of reinforcing fibers, the polymer composition can have a Charpy notched impact strength of greater than about 13 kJ/m² when tested according to ISO Test 179/1eU. In addition, the polymer composition can have a tensile modulus of at least about 10,000 MPa, such as at least about 12,000 MPa, such as at least about 14,000 MPa, such as even at least about 16,000 MPa when tested according to ISO Test 527-2/1A.

The polymer composition of the present disclosure can be used to make numerous and various molded articles for all different types of industries. For instance, the polymer composition can be used to produce gears, levers, cams, rollers, pulleys, latches, conveyor components, housings, and the like. The polymer composition, for instance, can be used to produce appliance parts or automotive parts. The automotive parts can comprise interior automotive parts or exterior automotive parts. In one embodiment, the polymer composition can contain lesser amounts of reinforcing fibers and may have higher melt flow characteristics. In this embodiment, the polymer composition can be used to mold articles having a complex shape and/or articles having thin walls. For instance, the polymer composition can be used to mold electronic components, such as connectors and keyboard components.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polyoxymethylene polymer composition containing reinforcing fibers. The polyoxmethylene polymer selected for use with the reinforcing fibers has a relatively high melt volume flow rate and optionally can contain functional groups that can serve to facilitate incorporating the reinforcing fibers into the polymer matrix. The polyoxymethylene polymer with the relatively high melt volume flow rate has been found to unexpectedly and dramatically reduce formaldehyde emissions, even when relatively great amounts of reinforcing fibers are present within the polymer matrix.

Polyoxymethylene Polymer

According to the present disclosure, the polyoxymethylene polymer composition comprises a polyoxymethylene polymer. In general, any suitable polyoxymethylene polymer may be incorporated into the polymer composition as long as the polymer has a relatively high melt volume flow rate. For example, the polyoxymethylene polymer may comprise a homopolymer or a copolymer. As described below, the polyoxymethylene polymer can also contain various functional groups that can further facilitate integration of the reinforcing fibers into the polymer matrix.

In accordance with the present disclosure, the polyoxymethylene polymer generally has a melt volume flow rate of greater than about 20 cm³/10 min, such as greater than about 25 cm³/10 min, such as greater than about 30 cm³/10 min, such as greater than about 35 cm³/10 min, such as greater than about 36 cm³/10 min. The melt volume flow rate of the polyoxymethylene polymer is generally less than about 100 cm³/10 min, such as less than about 80 cm³/10 min, such as less than about 60 cm³/10 min, such as less than about 55 cm³/10 min, such as less than about 50 cm³/10 min, such as less than about 45 cm³/10 min. The melt volume flow rate is determined according to ISO Test 1133 at 190° C. and at a load of 2.16 kg.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —CH₂O-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

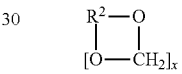

in which x is 0 or 1 and R² is a C₂-C₄-alkylene group which, if appropriate, has one or more substituents which are C₁-C₄-akyl groups, or are C₁-C₄-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 3 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal position. The reactive groups or functional groups can comprise any groups that are capable of forming a bond with a coupling agent. The reactive groups, for instance, may comprise —OH or —NH₂ groups.

In one embodiment, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 10 mmol/kg, such as at least 15 mmol/kg, such as at least 20 mmol/kg. For example, the polyoxymethylene polymer can have a content of terminal hydroxyl groups of greater than about 25 mmol/kg, such as greater than about 30 mmol/kg, such as greater than about 35 mmol/kg, such as greater than about 40 mmol/kg, such as greater than about 45 mmol/kg, such as greater than about 50 mmol/kg. The content of terminal hydroxyl groups on the polyoxymethylene polymer is generally less than about 150 mmol/kg, such as less than about 125 mmol/kg, such as less than about 100 mmol/kg, such as less than about 90 mmol/kg, such as less than about 80 mmol/kg.

In addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH$_2$O-repeat units.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2 wt. %.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_mM'_nO_z]_y H_2O$$

wherein
M represents an element selected from the group consisting of P, Si, Ge, Sn, As, Sb, U, Mn, Re, Cu, Ni, Ti, Co, Fe, Cr, Th or Ce,
M' represents an element selected from the group consisting of W, Mo, V or Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof. Excellent results have been achieved with heteropoly acids selected from 12-molybdophosphoric acid (H$_3$PMo$_{12}$O$_{40}$) and 12-tungstophosphoric acid (H$_3$PW$_{12}$O$_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfills the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

(ROOC)—(CH$_2$)$_n$—(COOR')

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

(ROOC)$_2$—CH—(CH$_2$)$_m$-CH—(COOR')$_2$ wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 wt. %, preferably in an amount ranging from 0.01 to 5 wt. %, wherein the weight is based on the entire solution.

In some embodiments, the polymer composition of the present disclosure may contain other polyoxymethylene homopolymers and/or polyoxymethylene copolymers. Such polymers, for instance, are generally unbranched linear polymers which contain at least 80%, such as at least 90%, oxymethylene units.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer may be present in the polyoxymethylene polymer composition in an amount of at least 30 wt. %, such as at least 35 wt. %, such as at least 40 wt. %, such as at least 45 wt. %, such as at least 50 wt. %. In general, the polyoxymethylene polymer is present in an amount of less than about 70 wt. %, such as less than about 65 wt. %, such as less than about 60 wt. %, wherein the weight is based on the total weight of the polyoxymethylene polymer composition.

Reinforcing Fibers

In accordance with the present disclosure, in addition to a polyoxymethylene polymer having a relatively high melt volume flow rate, the polymer composition also contains reinforcing fibers. The reinforcing fibers can be present in the polymer composition generally in an amount from about 3% to about 80% by weight. In one embodiment, for instance, the reinforcing fibers can be present in the polymer composition in an amount from about 3% to about 25% by weight. For example, the reinforcing fibers can be present in the polymer composition in an amount greater than about 3%, such as in an amount greater than about 5%, such as in an amount greater than about 8%, and generally in an amount less than about 25%, such as in an amount less than about 20%, such as in an amount less than about 15%, such as in an amount less than about 12%. When containing reinforcing fibers in the above amounts, the resulting polymer composition can have relatively high flow characteristics allowing the composition to be used to mold articles having complex shapes and thin walled articles.

In an alternative embodiment, the polymer composition can contain substantial amounts of reinforcing fibers. The reinforcing fibers, for instance, can be present in the polymer composition generally in an amount greater than about 30% by weight, such as in an amount greater than about 35% by weight, such as in an amount greater than about 40% by weight, such as in an amount greater than about 45% by weight, such as in an amount greater than about 50% by weight. The reinforcing fibers are generally present in an amount less than about 80% by weight, such as in an amount less than about 70% by weight, such as in an amount less than about 65% by weight, such as in an amount less than about 60% by weight.

Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glassfiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-amino-propyltrimethoxy-silane, N-(3-trimethoxysilanylpropyl)eth-ane-1,2-diamine, 3-(2-aminoethyl-amino)propyltrimethox-ysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment, the molding composition of the present invention comprises at least one reinforcing fiber which is a mineral fiber, preferably a glass fiber, more preferably a coated or impregnated glass fiber. Glass fibers which are suitable for the molding composition of the present invention are commercially available, e.g. Johns Manville, ThermoFlow® Chopped Strand 753, OCV Chopped Strand 408 A, Nippon Electric Glass Co. (NEG) Chopped Strand T-651H.

Fiber diameters can vary depending upon the particular fiber used and whether the fiber is in either a chopped or a continuous form. The fibers, for instance, can have a diameter from about 5 μm to about 100 μm, such as from about 5 μm to about 50 μm, such as from about 5 μm to about 15 μm.

Coupling Agent

In one embodiment, a coupling agent may be present. Coupling agents used include polyfunctional coupling agents, such as trifunctional or bifunctional agents. A suitable coupling agent is a polyisocyanate such as a diisocyanate. The coupling agent may provide a linkage between the polyoxymethylene polymer and the reinforcing fiber and/or sizing material coated on the reinforcing fiber. Generally, the coupling agent is present in an amount of at least about 0.1 wt. %, such as at least about 0.2 wt. % such as at least about 0.3 wt. % and less than about 5 wt. %, such as less than about 3 wt. %, such as less than about 1.5 wt. %. Alternatively, the composition may also be substantially free of any coupling agents such as less than about 0.2 wt. %, such as less than about 0.1 wt. %, such as less than about 0.05 wt. %, such as less than about 0.01 wt. %, such as about 0 wt. %.

A suitable coupling agent is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferred are polyfunctional coupling agents, such as trifunctional or bifunctional agents.

Preferably, the polyisocyanate is a diisocyanate or a triisocyanate which is more preferably selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-Isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis (isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

Other Additives

The polymer composition of the present disclosure may also contain other known additives such as, for example, antioxidants, formaldehyde scavengers, acid scavengers, UV stabilizers or heat stabilizers. In addition, the compositions can contain processing auxiliaries, for example adhesion promoters, lubricants, nucleants, demolding agents, fillers, or antistatic agents and additives which impart a desired property to the compositions and articles or parts produced therefrom.

In one embodiment, a formaldehyde scavenger, such as a nitrogen-containing compound, may be present. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger may be a guanamine compound which may include an aliphatic guanamine-based compound, an alicyclic guanamine-based compound, an aromatic guanamine-based compound, a hetero atom-containing guanamine-based compound, or the like.

The formaldehyde scavenger may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially, are pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl) propionohydrazide], and hexamethylene glycol bis[3-(3,5-di-tert-butyl-4-hydroxyphenyl)propionate]. The antioxidant may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lights stabilizers, such as sterically hindered amines, may be present. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lubricants may be present. The lubricant may comprise a polymer wax composition. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. In another embodiment, a fatty acid amide such as ethylene bis(stearylamide) may be present. Lubricants may generally be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a colorant may be present. Colorants that may be used include any desired inorganic pigments, such as titanium dioxide, ultramarine blue, cobalt blue, and other organic pigments and dyes, such as phthalocyanines, anthraquinnones, and the like. Other colorants include carbon black or various other polymer-soluble dyes. The colorant may be present in the composition in an amount of at least about 0.01 wt. %, such as at least about 0.05 wt. %, such as at least about 0.1 wt. % and less than about 5 wt. %, such as less than about 2.5 wt. %, such as less than about 1 wt. %, wherein the weight is based on the total weight of the respective polymer composition.

In one embodiment, an acid scavenger may be present. The acid scavenger may comprise, for instance, an alkaline earth metal salt. For instance, the acid scavenger may comprise a calcium salt, such as a calcium citrate. The acid scavenger may be present in an amount of at least about 0.001 wt. %, such as at least about 0.005 wt. %, such as at least about 0.0075 wt. % and less than about 1 wt. %, such as less than about 0.75 wt. %, such as less than about 0.5 wt. %, wherein the weight is based on the total weight of the respective polymer composition.

Polymer Articles

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like. According to the present disclosure, the polymer articles demonstrate excellent tribological behavior and mechanical properties. Consequently, the polymer articles can be used for several applications where low wear and excellent gliding properties are desired.

The polymer composition of the present disclosure can be used to produce various and numerous different types of polymer articles. The polymer articles can be used in all different types of industries. For instance, the polymer composition of the present disclosure can be used to produce consumer appliance parts, automotive parts, industrial parts, and the like. For instance, molded articles made according to the present disclosure include gears, levers, cams, rollers, pulleys, latches, conveyor components, and housings. An almost limitless variety of polymer articles may be formed from the polymer compositions of the present disclosure.

When the polymer composition contains lower amounts of reinforcing fibers, such as in amounts less than about 25% or less than about 15%, the polymer composition has high flow characteristics that allow the composition to be used to produce articles with complicated shapes and/or articles with very thin walls. In one embodiment, for instance, the polymer composition can be used to produce electrical or computer components. For instance, the polymer composition can be used to produce computer key board components. Alternatively, the polymer composition can be used to produce connectors. The connector, for instance, may contain insertion passageways that are configured to receive terminals or contact pins. These passageways are defined by opposing walls, which can be very thin and have small dimensional tolerance.

Properties

As described above, polymer compositions of the present disclosure have excellent formaldehyde emission properties even when containing substantial amounts of reinforcing fibers. For example, the polymer composition of the present disclosure can emit less than about 4.5 mg/kg, such as less than about 4 mg/kg, such as less than about 3.5 mg/kg, such as less than about 3.2 mg/kg, such as less than about 2.8 mg/kg, such as less than about 2.5 mg/kg, such as less than about 2.3 mg/kg, such as less than about 2 mg/kg, such as less than about 1.9 mg/kg of formaldehyde when tested according to Test VDA 275 after 24 hours using a plaque having a width of 2 mm (7 d/2 mm). The above formaldehyde emission properties are dramatic and unexpected especially in comparison to past polyoxymethylene polymer compositions containing substantial amounts of reinforcing fibers.

The polymer composition of the present disclosure also has excellent mechanical properties. For example, when tested according to ISO Test No. 527, the polymer composition may have a tensile modulus of greater than about 5,000 MPa, such as greater than about 10,000 MPa, such as greater than about 12,000 MPa, such as greater than about 14,000 MPa. The tensile modulus is generally less than about 50,000 MPa. In one embodiment, the stress at break can be greater than about 100 MPa, such as greater than about 160 MPa, such as greater than about 180 MPa. In one embodiment, the stress at break can be from about 160 MPa to about 250 MPa.

The polymer composition can exhibit a notched Charpy impact strength at 23° C. of greater than about 6 kJ/m$^2$, such as greater than about 13 kJ/m$^2$, such as greater than about 13.3 kJ/m², such as greater than about 13.5 kJ/m². The notched Charpy impact strength is generally less than about 30 kJ/m².

The polymer composition can exhibit a melt volume rate of from about 0.5 cm³/10 min to about 1.4 cm³/10 min in certain embodiments. In one embodiment, the melt volume rate is from about 0.7 cm³/10 min to about 1.3 cm³/10 min. Melt volume rate can be measured at 190° C. and at a load of 2.16 kilograms. When containing reinforcing fibers in amounts less than about 25% by weight, such as in amounts less than about 20% by weight, such as in amounts less than about 15% by weight, the melt volume rate can be relatively high, such as greater than about 4 cm³/10 min, such as greater than about 6 cm³/10 min, such as greater than about 8 cm³/10 min, such as greater than about 10 cm³/10 min. The melt volume rate is generally less than about 30 cm³/10 min, such as less than about 20 cm³/10 min.

The present disclosure may be better understood with reference to the following examples.

EXAMPLES

The examples of the invention are given below by way of illustration and not by way of limitation. The following experiments were conducted in order to show some of the benefits and advantages of the present invention.

The following polyoxymethylene polymers were used in the Examples:

POM 1: MVR 39 cm³/10 min; Polyoxymethylene with a content of 3.4 wt.-% dioxolane comonomer; portion of terminal OH groups: 54-80 mmol/kg; melting point: 165° C.

POM 2: MVR 8 cm³/10 min; Polyoxymethylene with a content of 3.4 wt.-% dioxolane comonomer; portion of terminal OH groups: 20-25 mmol/kg; melting point: 165° C.

Example 1

In this example, glass fiber filled polyoxymethylene samples 1 and 2, as well as a comparative example, were compounded using the components shown in Table 1. All percentages are given as weight percentages based on the entire composition. Mechanical tests were performed using tensile bars made from the corresponding composition and emission tests were performed using 2 mm plaques. The tensile bars were injection molded at a melt temperature of 205° C. Parts were molded and tested according to VDA 275. The results are shown in Table 2 below.

The testing of the prepared molding compositions was performed according to the following standards:

MVR (190° C.; 2.16 kg): ISO 1133;

Charpy notched impact strength: determined at 23° C. according to ISO 179-1/1eA(CNI);

Elongation at break, stress at break and tensile modulus have been determined according to ISO 527;

Formaldehyde emission has been determined according to VDA 275 (Verband der Automobilindustrie e.V. (VDA), July 1994);

Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning Calorimetry (DSC); heating rate 10 K/min according to ISO 11357-1, -2, -3.

Flow properties were measured using the length of a spiral injection molded under defined conditions (melt temperature: 205° C., tool temperature: 90° C., coil thickness; 0.8 mm/2 mm, injection pressure: 800 bar/1000 bar/1200 bar).

Glass fiber content was measured according to ISO 3451-1 (60 min at 600° C.).

TABLE 1

| Component | Sample 1 | Sample 2 | Comparative |
|---|---|---|---|
| POM 1 | 58.69% | 48.69% | |
| POM 2 | | | 73.69% |
| stabilizers | 0.31% | 0.31% | 0.31% |
| 4,4'-diphenylmethane diisocyanate (MDI) | 0.5% | 0.5% | 0.5% |
| Polyoxymethylene Terpolymer | 0.5% | 0.5% | 0.5% |
| Glass Fiber | 40% | 50% | 25% |
| Total Composition | 100% | 100% | 100% |

TABLE 2

| Property | Sample 1 | Sample 2 | Comparative |
|---|---|---|---|
| Glass Content [%] | 40 | 50 | 25 |
| Charpy Notched Impact Strength [kJ/m²] | 13.7 | 13.6 | 12.8 |
| Tensile Modulus [MPa] | 14400 | 18400 | 8900 |
| Stress at Break [MPa] | 190 | 200 | 153 |
| Elongation at Break [%] | 2.7 | 2.3 | 3.33 |
| Melt Index (MVR) [cm³/10 min] | 1.3 | 0.9 | 1.4 |
| Formaldehyde Emission (7 d/2 mm) [mg/kg] | 3 | 3 | 5 |
| Flow Spiral 0.8 mm/ 800 bar [mm] | 71 | — | 64 |
| Flow Spiral 0.8 mm/ 1000 bar [mm] | 85 | — | 77 |
| Flow Spiral 0.8 mm/ 1200 bar [mm] | 99 | — | 89 |
| Flow Spiral 2 mm/ 800 bar [mm] | 287 | — | 261 |
| Flow Spiral 2 mm/ 1000 bar [mm] | 338 | — | 307 |
| Flow Spiral 2 mm/ 1200 bar [mm] | 384 | — | 343 |

Example No. 2

In this example, a glass fiber filled polyoxymethylene sample, as well as a comparative example, were compounded using the components shown in Table 3 below. All percentages are given as weight percentages based on the entire composition. Mechanical tests were performed using tensile bars made from the corresponding composition and emission tests were performed using 2 mm plaques. The tensile bars were injection molded at a melt temperature of 205° C. Parts were molded and tested according to VDA 275. The results are shown in Table 2 below.

The testing of the prepared molding compositions was performed according to the following standards:

MVR (190° C.; 2.16 kg): ISO 1133;

Charpy notched impact strength: determined at 23° C. according to ISO 179-1/1eA(CNI);

Elongation at break, stress at break and tensile modulus have been determined according to ISO 527;

Formaldehyde emission has been determined according to VDA 275 (Verband der Automobilindustrie e.V. (VDA), July 1994);

Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning Calorimetry (DSC); heating rate 10 K/min according to ISO 11357-1, -2, -3.

Flow properties were measured using the length of a spiral injection molded under defined conditions (melt temperature: 205° C., tool temperature: 90° C., coil thickness; 0.8 mm/2 mm, injection pressure: 800 bar/1000 bar/1200 bar).

Glass fiber content was measured according to ISO 3451-1 (60 min at 600° C.).

TABLE 3

| Component | Sample POM 1 | Comparative POM 2 |
|---|---|---|
| POM [%] | 88.69 | 88.69 |
| Stabilizers [%] | 0.81 | 0.81 |
| MDI [%] | 0.5 | 0.5 |
| Glass Fiber [%] | 10 | 10 |
| Total Composition | 100% | 100% |

TABLE 4

| Property | Sample | Comparative |
|---|---|---|
| Glass Content [%] | 9.91 | 9.76 |
| Charpy Notched Impact Strength [kJ/m$^2$] | 6.2 | 6.8 |
| Tensile Modulus [MPa] | 5150 | 4680 |
| Stress at Break [MPa] | 107 | 99 |
| Strain at Break [%] | 3.7 | 4.7 |
| Melt Index (MVR) [cm$^3$/10 min] | 11.7 | 3.6 |
| Formaldehyde Emission (7 d/2 mm) [mg/kg] | 1.9 | 3.1 |
| Flow Spiral 0.8 mm/ 800 bar [mm] | 127.6 | 84.4 |
| Flow Spiral 0.8 mm/ 1000 bar [mm] | 146 | 98.4 |
| Flow Spiral 0.8 mm/ 1200 bar [mm] | 162.5 | 111.7 |
| Flow Spiral 2 mm/ 800 bar [mm] | 548.7 | 319.5 |
| Flow Spiral 2 mm/ 1000 bar [mm] | 632.6 | 371.6 |
| Flow Spiral 2 mm/ 1200 bar [mm] | 715.1 | 419.6 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
a polyoxymethylene polymer;
reinforcing fibers blended with the polyoxymethylene polymer, the reinforcing fibers being present in the polymer composition in an amount from about 10% to about 40% by weight and
wherein the polyoxymethylene polymer has a melt volume flow rate of greater than about 20 cm$^3$/10 min when measured at 190° C. and at a load of 2.16 kg, wherein the polyoxymethylene polymer includes reactive groups at terminal positions on the polymer, the reactive groups comprise hydroxyl groups, the hydroxyl groups being present on the polyoxymethylene polymer in an amount greater than about 35 mmol/kg;
a sterically hindered phenol;
a formaldehyde scavenger;
a nucleant;
a coupling agent; and
wherein the polymer composition emits 4 mg/kg or less of formaldehyde when tested according to Test VDA 275 after 24 hours using a plaque having a width of 2 mm, and wherein the polymer composition has a tensile modulus of at least 12,000 MPa when tested according to ISO Test 527-2/1A.

2. A polymer composition as defined in claim 1, further comprising an ultraviolet light absorber.

3. A polymer composition as defined in claim 2, wherein the ultraviolet light absorber comprises a benzo compound.

4. A polymer composition as defined in claim 1, wherein the coupling agent comprises a polyisocyanate.

5. A polymer composition as defined in claim 1, wherein the formaldehyde scavenger comprises a melamine.

6. A polymer composition as defined in claim 1, wherein the nucleant comprises an oxymethylene terpolymer.

7. A polymer composition as defined in claim 1, wherein the polyoxymethylene polymer has a melt volume flow rate of greater than about 25 cm$^3$/10 min and generally less than about 100 cm$^3$/10 min at 190° C. and at a load of 2.16 kg according to ISO Test 1133.

8. A polymer composition as defined in claim 1, wherein the reinforcing fibers comprise glass fibers.

9. A polymer composition as defined in claim 1, wherein the hydroxyl groups are present on the polyoxymethylene polymer in an amount greater than about 45 mmol/kg.

10. A polymer composition as defined in claim 1, wherein the coupling agent comprises an aliphatic diisocyanate, a cycloaliphatic diisocyanate, an aromatic diisocyanate, or mixtures thereof.

11. A polymer composition as defined in claim 1, wherein the coupling agent is present in the polymer composition in an amount from about 0.1% to about 2% by weight.

12. A polymer composition as defined in claim 1, wherein the reinforcing fibers are coated with a sizing agent.

13. A polymer composition as defined in claim 1, wherein the polymer composition has a Charpy notched impact strength of greater than about 13 kJ/m$^2$ when tested according to ISO Test 179/1eU at 23° C.

14. A polymer composition as defined in claim 1, wherein the polymer composition has a melt flow rate of greater than about 5 cm$^3$/10 min.

15. A molded article made from the polymer composition as defined in claim 1.

16. A molded article as defined in claim 15, wherein the molded article comprises a gear, a lever, a cam, a roller, a sliding element, a pulley, a latch, a claw, a conveyor component, or a housing.

17. A molded article as defined in claim 15, wherein the molded article comprises a keyboard component or an electrical component.

\* \* \* \* \*